United States Patent [19]

Takagi et al.

[11] Patent Number: 5,058,953
[45] Date of Patent: Oct. 22, 1991

[54] SEAT BACK OF AUTOMOTIVE SEAT

[75] Inventors: Genjiro Takagi; Yasuhiko Kamei, both of Akishima, Japan

[73] Assignee: Tachi-S Co., Ltd., Tokyo, Japan

[21] Appl. No.: 373,958

[22] Filed: Jun. 30, 1989

[51] Int. Cl.$^5$ ............................................... A47C 3/00
[52] U.S. Cl. ............................... 297/284 B; 297/408; 297/460
[58] Field of Search ............... 297/408, 353, 355, 452, 297/285, 300, 460, 284

[56] References Cited

U.S. PATENT DOCUMENTS

| | | | |
|---|---|---|---|
| 4,157,203 | 6/1979 | Ambasz | 297/300 |
| 4,585,272 | 4/1986 | Ballarini | 297/300 |
| 4,799,732 | 1/1989 | Yamazaki | 297/300 |

FOREIGN PATENT DOCUMENTS

| | | | |
|---|---|---|---|
| 3404379 | 8/1985 | Fed. Rep. of Germany | 297/408 |
| 1579537 | 7/1969 | France | 297/408 |
| 53-149326 | 11/1978 | Japan | |
| 58-61065 | 4/1983 | Japan | |

Primary Examiner—Peter A. Aschenbrenner
Attorney, Agent, or Firm—Browdy and Neimark

[57] ABSTRACT

A seat back of an automotive seat of the type having upper and lower seat-back sections, in which the upper seat-back section is formed independently of the lower one and further inclinable relative thereto. The connection between the upper and lower seat-back sections is designed so close as to avoid undesired part such as rift or gap therebetween. Further, a hole in that connection area is prevented from being viewed externally by an auxiliary covering member, and a "C"-shaped incision is formed at that connection area of padding, so that its lid may be taken out from or inserted back into its hole, for opening or closing the hole. With this structure, an outer aesthetic appearance of the seat is far improved.

13 Claims, 4 Drawing Sheets

FIG.4
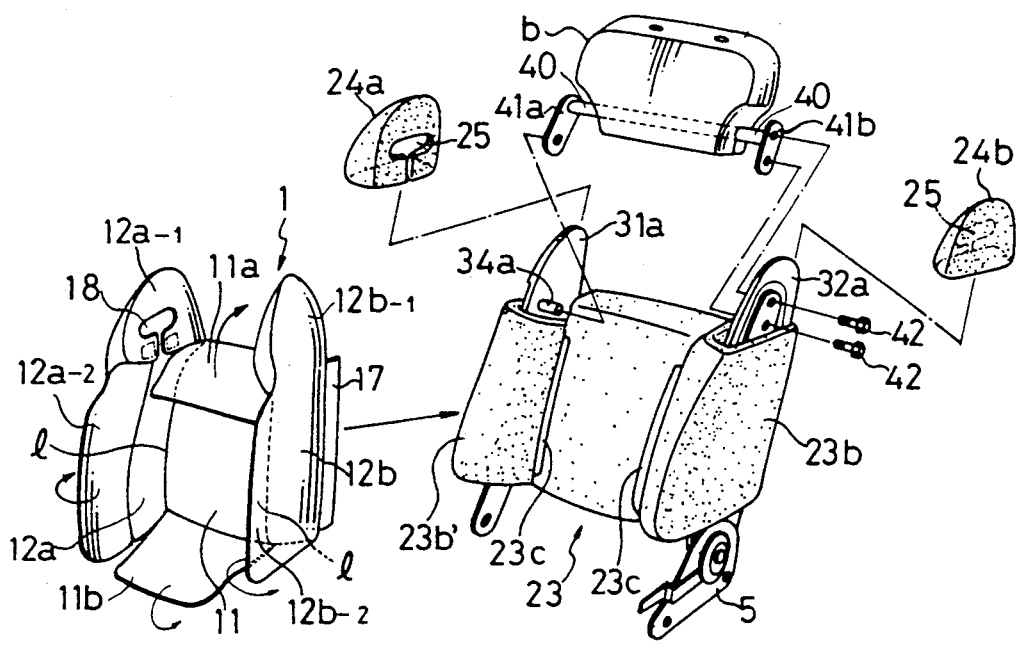
FIG.5
FIG.6
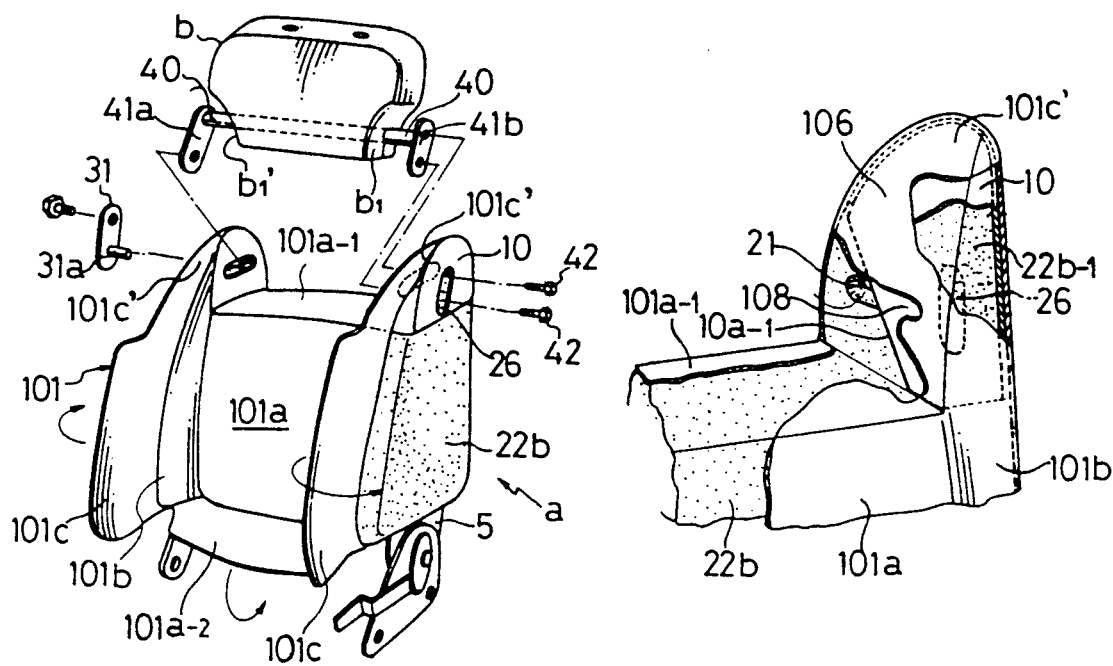

SEAT BACK OF AUTOMOTIVE SEAT

BACKGROUND OF THE INVENTION

1. Field of the Invention

The present invention relates to a seat back of an automotive seat, and in particular relates to an upper-part inclinable seat back in which the upper part or upper half part of the seat back may be inclined by operation of its upper-part inclining device.

2. Description of Prior Art

A typical conventional upper-part inclinable seat back is shown in FIG. 1, in which the seat back designated at (A') is comprised of an upper seat back section (b') and a lower seat back section (a'), the upper seat back section (b') being rotatably connected to the lower one (a') such that the former is free to rotate forwardly and backwardly relative to the latter. According to this prior art, a unitary seat covering member (a'-1) is affixed over those two seat back sections (a') (b'), giving such an outer appearance as if the two sections (a') (b') were continuously connected with each other in an integral manner.

However, as can be seen from the FIG. 1, (because) of its unitary nature, the covering member (a'-1) is found defective in that it will form a non-unitary rift area in between the upper and lower seat back sections (b') (a') when the upper seat back section (b') is rotated forwardly. Such rift part created on the surface of seat apparently impairs the aesthetic appearance of the seat.

SUMMARY OF THE INVENTION

It is a first purpose of the present invention to provide a seat back for an automotive seat in which there is no unpleasing rift or gap on the outer surface covering member between an upper seat-back section and a lower seat-back section.

To achievement this purpose, according to the invention, the upper and lower seat-back sections are formed independently of each other and connected with each other rotatably to permit fore-and-aft inclination of the upper seat-back section relative to the lower one, wherein the upper seat-back section is formed with a pair of arcuate cut-away portions respectively at its both lower lateral parts, whereas the lower seat-back section has, formed at its upper side, a pair of upwardly projected parts each having an arcuate which conforms to the respective two arcuate cut-away portions of the lower seat-back section, such that those two mating arcuate portions of both upper and lower seat-back sections are juxtaposed together.

Accordingly, due to such closed connection between the upper and lower seat-back sections, there is no unpleasing rift or gap therebetween.

It is a second purpose of the present invention to provide a means for avoiding an undesired view of inner side associated with the lower seat-back section in the foregoing seat back structure.

As with the seat back, to allow the fore-and-aft inclination of the upper seat-back section upon the lower one, the shaft of the upper seat-back section is moved in a horizontal elongated hole formed in each of the two upwardly projected parts of the lower seat-back section, which elongated hole gives an undesired view in the seat. According to the present invention, there is provided a covering member which covers such lower seat-back section, covering member includes a pair of auxiliary covering members which are adapted to cover respectively the two upwardly projected parts, each of the auxiliary covering members being formed in a cap-like shape, having an inclined cut edge formed at its inner surface. The inclined cut edge provides a covering shield over the forward partial or forward half region of the elongated hole in question, so that when the upper seat-back section is inclined backwardly, showing that hole, the cover area followed by the inclined cut edge covers the hole and prevents the hole and its inside from being viewed externally.

It is a third purpose of the present invention to provide a means for avoiding a slack, wrinkled or recessed portion which is created at the portion of the covering member in the seat back where the upper seat-back section is connected to the lower one by means of bolts. As with the seat back, the upper and lower seat-back sections are connected together via framework inside the padding and the bolts need to be driven from the outside of the padding, therefore, a hole is formed at the corresponding area of the padding, through which hole the bolts are made accessible to the inner framework for connecting the upper seat-back section to the lower one. In view of the fact that the covering member, which overlies that hole, has such slack, wrinkle or recessed portion therein, according to the present invention, the part of the padding in question is formed with a lid and hole which are partly integral together. The lid and hole are formed by cutting the corresponding part of the padding in a manner giving a generally "C"-shaped incision, in which the lid is forcibly taken out and turned outwardly from the incision about the non-incised area, thereby defining the hole and permitting access of the bolts into the frame parts through the hole. Thereafter, the lid is turned back and inserted in the hole, and it is appreciated that the outer surface of the lid lies flush with the surrounding surface of the padding, and thus there is eliminated such slack, wrinkle, or recessed portion in the part of the covering member that overlies the the lid and hole.

BRIEF DESCRIPTION OF THE DRAWINGS

FIG. 4 is an exploded perspective view of a seat back in a second embodiment of the present invention;

FIG. 5 is an exploded perspective view of a seat back in a third embodiment of the present invention;

FIG. 6 is a partly broken perspective view showing a principal part of the third embodiment;

DETAILED DESCRIPTION OF PREFERRED EMBODIMENTS OF THE INVENTION

Figure 2:
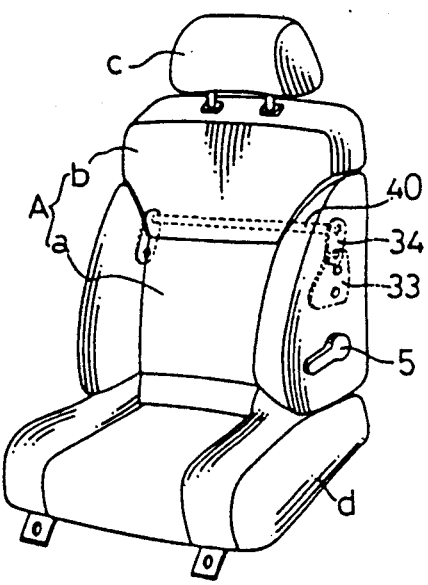
FIG. 2 is a perspective view of a seat assembled in accordance with the present invention.

In referring to FIG. 2, there is illustrated an upper-part inclinable type of seat back (1) of an automotive seat which has been finished in accordance with the present invention. Designations (a), (b) and (c) respectively denotes a lower seat back section, an upper seat-back section, and a head rest. Designation (d) denotes a seat cushion. In this particular seat back (1), the lower seat-back section (a) is rotatablly connected to the seat cushion (d), and adjustably inclinable by means of a reclining device (5).

Figure 3:
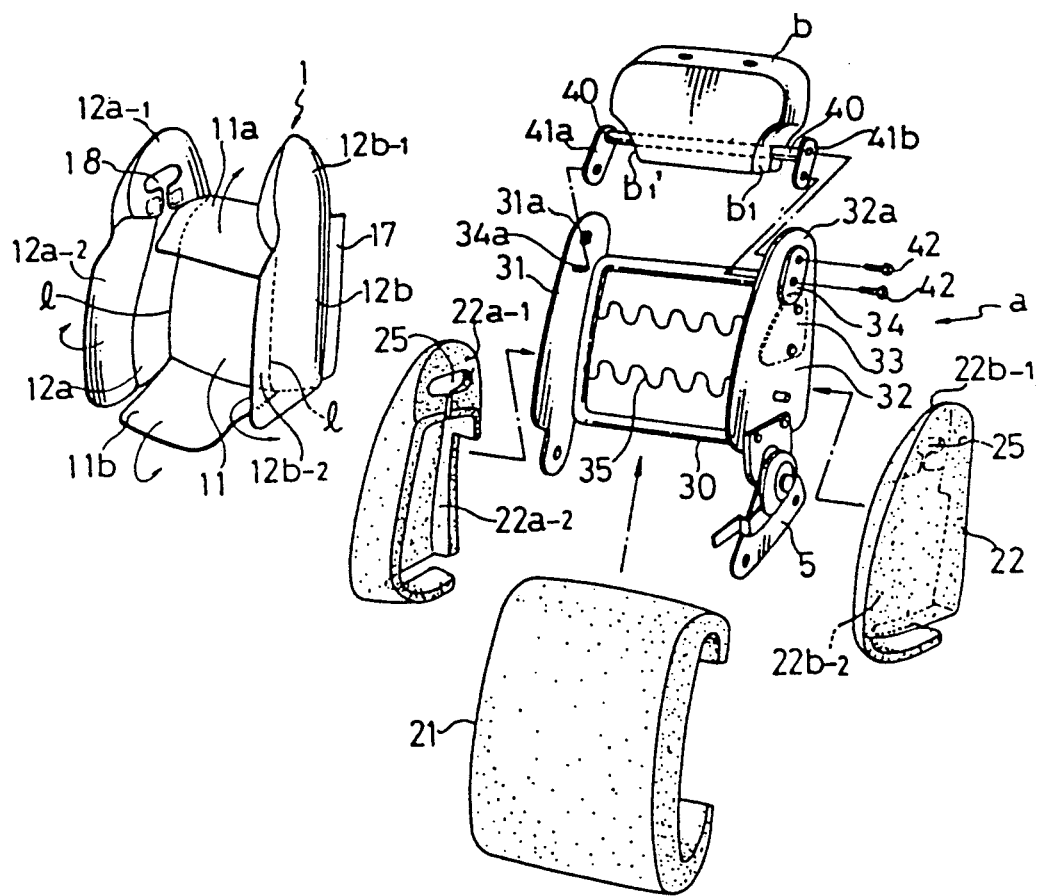
FIG. 3 is an exploded perspective view of a seat back in a first embodiment of the present invention.

Referring now to FIG. 3, there is shown a first embodiment of the present invention. According to this embodiment, the upper seat-back section (b) is comprised of a covering member, a padding covered with the covering member, and a frame provided within the body of the upper seat-back section (b). As shown, the upper seat-back section (b) is so formed that its lower lateral portions are each formed with an inwardly arched cut-away portion (b1 or b1′). From both such arcuate cut-away portions (b1) (b1′), there extends outwardly both ends of a shaft (40), respectively. A pair of connecting links (41a) (41b) are respectively welded to both ends of the shaft (40).

The lower seat-back section (a) is comprised of a frame (30) of a generall square-like shape, which is formed by bending a tubular material into the square shape, and zig-zag springs (35) (35) are extended in the frame (30), as with the conventional seats. To both lateral bar sections of the frame (3), are respectively welded a pair of side brackets (31) (32), both of them having upper extension (31a) (32a), respectively, at their upper ends, in a manner so that they project above the upper bar section of the frame (30). Further, the lower seat-back section (a) comprises, as its padding material, a main padding (21) which is attached over the whole body of the frame (30), and a pair of sub-paddings (22a) (22b), each of which is attached over the respective pair of brackets (31) (32). The illustrated main padding (21) is of a generally C-shaped form to embracingly cover the frame (30), and two sub-paddings (22a) (22b) are respectively formed with opened areas (22a-2) (22b-2) at one side, and upwardly projected at upper end portions (22a-1) (22b-1), wherein the inner surfaces respectively of the upper end portions (22a-1) (22b-1) are formed with elongated holes (25) (25). Hence, the framework of the lower seat-back section (a) is wholly covered with those three paddings (21) (22a) (22b).

The reclining device (5) is fixed at the lower end portion of the side bracket (32).

The right side bracket (33), as viewed from FIG. 3, is provided with a movable bracket (34), and the left side bracket (31) is provided, at its inner wall, provided with a support shaft (34a). To those movable brackets (31) and support shaft (34a), are respectively connected the foregoing connecting links (41a) (41b) of the upper seat-back section (b).

In this respect, more specifically, the left-side connecting link (41a) is at its lower end part rotatably connected to the support shaft (34a), whereas the right-side connecting link (41b) is at its lower end part fixedly secured to the movable bracket (34) by means of bolts (42) (42). The movable bracket (34) is operatively connected with an adjusting device (33) for adjusting the for-and-aft inclination of the upper seat-back section (b), which is provided at a proper point in the right-side side bracket (33). As also viewed from FIG. 2, the adjusting device (33) is connected further with an operation handle (5) provided externally of the (laterala) side of the seat back (A), so that the operation of the handle (5) permits adjusting the inclination of the upper seat-back section (b) in a forward or back-ward direction with respect to the lower seat-back section (a). The movable bracket (34) is pivotally fixed to the side bracket (32) in a free-to-rotate manner so that the the upper seat-back section (b) is forwardly and back-wardly rotated, or inclined, about the rotation center, which corresponds to the pivot point of the movable bracket (34). It is therefore seen that the rotation center of the upper seat-back section (b) exists within the lower seat-back section (a), and the former section (b) is free to be rotated about such point in a fore-and-aft directions relative to lower seat-back section (a).

In assembling the seat back (A), the foregoing three paddings (21), (22a) and (22b), are attached over the relevant elements of the framework of the lower seat back section (a), with the covering member (1) bonded to the main padding (21).

Before describing the way in which the covering member (1) is affixed to the paddings, specific mention will be made of the covering member (1) per se. The covering member (1), as shown in FIG. 3, comprises a central seat section at (11), (11a), (11b), and a pair of side seat sections at (12a) (12b). The central seat section (11, 11a, 11b) is dimensioned to cover the main padding (21), and the two side seat sections (12a) (12b) are respectively formed with side marginal sections (12a-2) (12b-2) upwardly projected to cap-like sections (12a-1) (12b-1), and anchoring cloths (17) (17) with each of the two side seat sections (12a) (12b) being so dimensioned to cover the two sub paddings (22a) (22b). It should be noted here that the thus-formed covering member (1) is shown turned inside out, for the reason that is required to be affixed to covering member (1) over the main and sub-paddings (21) (22a) (22b), as will become apparent later.

In the practical assemlage of the seat back (A), a turned-inside-out covering member (1) is prepared and a first step is to bond the reverse side of the central seat section (11) of the covering member (1) to the outer surface of the main padding (21), then attach thus-bonded material over the frame (30). Next the the upper seat-back section (b) is connected to the (framework) of the lower seat-back section (a), as previously stated, via the connecting links (41a) (41b) and movable bracket (34), after which, the two sub paddings (22a) (22b) are attached over the side brackets (31) (33), respectively, by inserting the side brackets (31) (33) into the opened areas (22a-2) (22b-2) of both sub paddings (22a) and placing the former within the latter, with the shaft (40) of the upper seat-back section (b) passing through the elongated holes (25) (25) of the sub paddings (22a) (22b), and secondly, the extension cloths (17) (17) are inserted in between the main and sub paddings (21) (22a) (22b), and then, the upper and lower parts (11a) (11b) of the central seat section (11) as well as the two side seat sections (12a) (12b) are folded backwardly in the arrow directions so that the inside-out state of the covering member (1) is turned to a normal state shown its outer surface, at which time, the cap-like sections (24a) (24b) are turned at 360 degree about the axises (l) (l) which are defined at both bound lines between the central seat section (11) and two side seat sections (12a)

Figure 1:
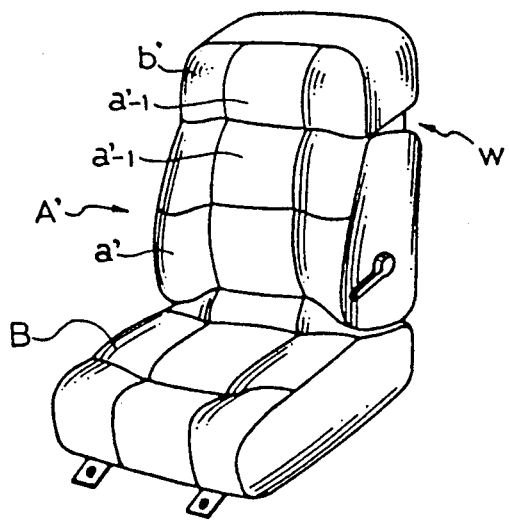
FIG. 1 is a perspective view of a conventional seat.

(12b) while simultaneously being turned from their inside-out states to normal states showing their outer surfaces. In that way, the inside-out covering member (1) is folded back into a normal three-dimensional state, covering the main and sub paddings (21)(22a)(22b), and then, although not shown, the anchoring cloths (17)(17), which are inserted through the main and sub paddings, are fixedly secured to the zig-zag springs (35)(35) by means of hog rings or the like, and further the upper and lower parts (11a) (11b) of the central seat section (11) as well as the two side marginal sections (12a-2)(12b-2) are also fixedly secured to the zig-zag springs (35)(35) by such hog rings. As a result of this assembling steps, there is produced such an upper-part inclinable seat back (A) as shown in FIG. 2, in which no rift or no cut part is found in the conventional seat as in FIG. 1.

Now, with reference to FIG. 4, there is shown a second embodiment, wherein, in contrast to the above-described three separate paddings, one integral main padding (23) is provided as a new main padding for the lower seat-back section (a). As can be seen, the main padding (23) is formed (by being foamed in a mold) into a predetermined shape sufficient to cover almost all of the framework of the lower seat-back section (a); that is to say, the main padding is so formed as to cover almost whole body of the frame (30) and both side brackets (31a)(32a), excepting both upper end portions (31a)(32a) of the two side which is turned inside out, is firstly bonded at its central seats section (22) to the corresponding central seating part (23a) of the main padding (23), like the above first embodiment, with the anchoring cloths (17)(17) being inserted into the respective vertically extending recessed grooves (23c)(23c) of the main padding (23), and while folding backwards the upper and lower parts (11a)(11b) as well as the two side marginal sections (12a-2)(12b-2), thereby causing those parts (11a)(11b)(12a-2)(12b-2) to cover and be bonded to the rear side of the central seating part (23a) and two side bolster parts (23b')(23b) of the main padding (23), respectively, at which time, as previously stated, both upwardly projected cap-like sections (12a-)(12b-1) associated with the covering member (1) are turned at 360 degrees from the inside-out state to normal state showing their outer surfaces, to thereby cover the surfaces of the two sub paddings (24a)(24b) and be bonded thereto. Consequently, in that manner, there is produced an upper-part inclinable seat back (A) as shown in FIG. 2.

Accordingly, from the above-described first and second embodiments, it it to be appreciated that the upper seat-back section (b) and lower seat-back section (a) are separate from each other, in which sense, the associated covering members are completely affixed over the paddings respectively of those two seat back sections (a)(b) and thus the seat assemblage does not take care of the covering member in terms of such rift or undesired cut part as found in the prior art, therefore, simply connecting the upper seat-back section (b) to the lower seat-back section (a) results in completing the formation of the seat, so that the seat assembling steps are much simplified and the assemblage flow is rendered more rapid and smooth. Further, it is appreciated that, the arcuate lower lateral sides (b1)(b1') of the upper seat-back section (b) conform in shape to the outer contour of the two upwardly projected parts of the lower seat-back section (a), and superposed thereupon, so that the connected state between the upper and lower seat-back sections (b)(a) is not clearly exposed to view when viewed from one side of the seat, which is also the case even when the upper seat-back section (b) is inclined forwardly or backwardly, and therefore improves the aesthetic appearance of the seat.

FIGS. 5 through 8 illustrate the third embodiment of the present invention.

The present embodiment is directed to providing a means for avoiding an undesired view of the elongated holes (18, or 25) when the upper seat-back section (b) is inclined backwardly relative to the lower one (a). Nonetheless, this third embodiment includes its own structure of seat back of the upper-part inclinable type as can be seen from FIG. 5, which is somewhat different from that of the first and second embodiments above, and thus, a description will be made based on such seat back. It should be understood that the third embodiment will, of course, be applicable to the seat backs of the first and second ones, let along the one that will be described below.

FIG. 5 shows the particular seat back sections forming the seat back (A) in FIG. 2; namely, an upper seat-back section (b) identical to that of the first and second embodiments, and a lower seat-back section (a). In more particular, the lower seat-back section (a) comprises a covering member (101) and a padding (22b). The padding (22b) is one integral mass of padding which, like the main and sub paddings of the first and second embodiments, is adapted to be attached over the frames, side brackets and other frame elements (not shown) of the lower seat-back section (a). This padding (22b) includes, at its upper side, a pair of upwardly projected upper end parts (22b-1)(22b-1) which are defined at the respective both lateral sides of the padding (22b) in a mutually spaced-apart relation. Each of those two upwardly projected upper end parts (22b-1)(22b-1) has a horizontal enlongated hole (21) (see FIG. 6) formed at its outer lateral wall and a vertical enlogated hole (26) at its inner lateral wall.

Although not shown, in this embodiment, such frame (30), two side brackets (31)(32), adjusting device for adjusting the inclination of the upper seat-back section (b), and movable bracket (24) as in the above first and second embodiments are provided and covered with the foregoing padding (a).

Figure 7A:
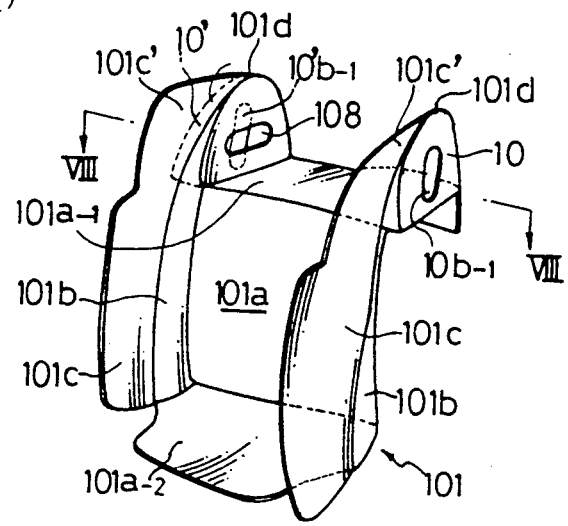
FIG. 7(A) is a perspective view of a covering member in the third embodiment.

The present embodiment, as mentioned earlier, being intended to avoid the unpleasing view of the horizontal elongated holes (21), the formation of the covering member (101) is, therefore, such that as best shown in FIG. 7(A), it comprises a central seat section (101a) having an upper part (101a-1) and a lower part (101a-2), a pair of side seat sections (101b)(101b) jointed respectively to both side ends of the central seat section (101a), a pair of side marginal seat sections (101c)(101c) jointed respectively to both free sides of the side of the seat sections (101b)(101b), a pair of upwardly projected upper end parts (101d)(101d) each having a horizontal elongated hole (108) at its inner standing wall (106), and a pair of independent cap-like auxiliary covering members (10)(10'), each of which is fixed to the respective insides of the two upwardly projected upper end parts (101d)(101d). It should be noted here that the inner standing walls (106)(106) of the upper end parts (101d)(101d) are formed so arcuate to conform to the respective arced contour of the lower lateral parts (b1)(b1') of the upper seat-back section (b), and so are the upwardly projected upper end parts (22b-1)(22b-1) of the padding (22b).

Figure 7B:
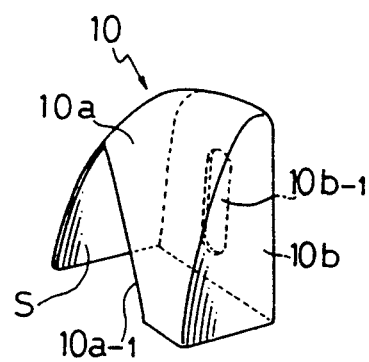
FIG. 7(B) is a perspective view of an auxiliary covering member in the third embodiment.
Figure 8:
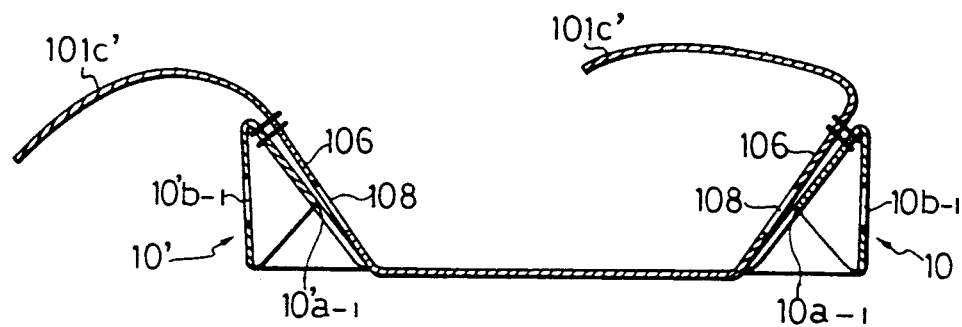
FIG. 8 is a sectional view taken along the line VIII—VIII in the FIG. 7(A)

The two auxiliary covering members (10)(10'), as can best be seen from FIGS. 6, 7(B) and 8, are each formed independently of the covering member (101) and in a cap-like shape having an arcuate surface (10a) and a vertical surface (10b), which conforms to the outer shape of the respective two upper end parts (22b-1)(22b-1) of the padding (22b), whereby, as understandable from FIG. 5, the left-side upper end part (22b-1) is to be covered with the same-side auxiliary covering member (10') whereas the right-side upper end part (22b-1) is to be covered with the other auxiliary covering member (10). As the two auxiliary covering members (10)(10') are basically identical to each other in structure, a more specific description will be given of one auxiliary covering member (10) only, by referring FIG. 7(B). As illustrated in the FIG. 7(B), the auxiliary covering member (10) is formed with a inclined cut edge (10a-1) at its arcuate surface (10a), defining a generally triangular opening (s) therein, and further at its vertical surface (10b) formed with a vertical enlogated hole (10b-1).

Thus-formed auxiliary covering members (10)(10b') are fixed at their top areas by sewing, part-way, to the respective insides of the two upwardly projected upper end parts (101d)(101d), as best shown in FIG. 8.

Referring now to FIG. 5 and 6, is shown the state wherein the foregoing covering member (101) with auxiliary covering members (10)(10') is bonded to the padding (22b), covering the same. It is observed from FIG. 6 that the inclined cut edge (10a-1) of the auxiliary covering member (10) spreads over a certain opened area of the horizontal elongated hole (21) associated with the padding (22b), whereupon there is defined an opened area and a closed area in the horizontal elongated hole (21). Preferably, at least generally half the opened area and half the closed area are defined within the hole (21). It is further seen that the horizontal enlongated hole (108) of the upper end part (101d) of the covering member (101) is disposed at a point corresponding to that hole (108) and identical in size thereto as well, while the vertical elongated hole (10b-1) of the auxiliary covering members (10) is also disposed (10) is also disposed at a point corresponding to the vertical elongated hole (26) associated with the padding (22b) and identical in size thereto. That is essential because the shaft (40) of the upper seat-back section (b1) passes through those horizontal elongated holes (18)(21) and is movable forwardly and backwardly therealong, as understandable from FIG. 5. Hence, the shaft (40) passes through the opened area in the elongated holes (18)(21).

As shown in FIG. 5, after having bonded the covering member (101) to the padding (22b), with the two auxiliary covering members (10)(10') being not bonded, but merely attached thereto, a securing bracket (32) with support pin (31a) is fixedly attached through the left-side vertical elongated holes (26)(10b) to the frame within the padding (22b), and the connecting link (41a) of the upper seat-back section (b) is inserted through the horizontal elongated holes (18, 21) and connected to the support pin (31a) rotatably, after which, also the other connecting link (41b) is inserted through the other horizontal elongated holes (18, 21) and fixed to the movable bracket (not shown) by means of bolts (42)(42) which are inserted through the right-side vertical elongated holes (26)(10b-1). The way in which the covering member (101) with the two auxiliary covering members (10)(10') is bonded to the padding (24b) is preferably such that, firstly, the two auxiliary covering members (10)(10') are placed upon the respective upper end parts (22b-1)(22b-1) of the padding (22b), and then the central seat section (101a) and its upper part (101a-1) are bonded to the upper surfaces of the padding (24b), and the side seat section (101b), side marginal seat section (101c) and lower part (101b-1) of the central seat section (101a) are turned backwards in the arrow directions, as in FIG. 5, so that those sections of the covering member (101) are bonded to the corresponding side and lateral surfaces and lower surface of the padding (22b). At this point, both vertical surfaces (10b) and elongated holes (26)(10b-1) are respectively covered with the upper portions (101c')(101c') of the side marginal seat sections (101c)(101c) to thereby be kept away from exposure into view.

It should be noted that, exactly as shown in FIG. 6, the triangular opening (s) becomes reduced in a direction forwardly of the lower seat-back section (a) as the inclined cut edge (10a-1) proceeds downwardly to the lower base edge of the auxiliary covering member (10), for which reason, the horizontal elongated hole (21, 108), as juxtaposed with the inclined cut edge (10a-1), is closed at its forward half region, or precisely speaking, the forward half region of the hole (21, 108) is shielded by the cover area (i.e. at (10a)) followed by that inclined cut edge (10a-1), hence avoiding an unpleasing view of the hole (21, 108) at the forward half region thereof.

Accordingly, when the upper seat-back section (b) is inclined backwardly upon the lower one (a), here comes into view the inner arcuate surfaces of two upper end parts (101d)(101d), showing the forward partial or half regions of the horizontal elongated holes (108), but the presence of the inclined cut edges (10a-1)(10a'-1) in the holes (108) provides a covering shield at the holes (108), whereby the the holes (108) per se and inside thereof are in no way exposed to view.

In this connection, it is desirable that the inclination angle of the inclined cut edges (10a-1) (10a'-1) be set in confomity with the backward inclination angle limit of the upper seat-back section (b).

Of course, the shaft (40) of the upper seat-back section (b) is normally positioned mid-way in the horizontal elongated holes (108, 21), passing therethrough, with the inclined cut edge (10a-1) overlaying the shaft (40), but, when the upper seat-back section (b) is inclined backwardly, the shaft (40) is slidingly moved backwardly along the hole (108, 21) in a direction away from the inclined cut edge (10a-1). On the other hand, when the upper seat back section (b) is inclined forwardly, the shaft (40) is moved forwardly along the hole (108, 21), pressing and deforming the inclined cut edge (10a-1). In that case, the inclined cut edge (10a-1) is elastically deformed to permit forward movement of the shaft (40) and will be recovered into its normal shape when the shaft (40) is moved back, so that the covering shield effect is maintained by the inclined cut edge (10a-1) with respect to the forward half region of the horizontal elongated hole (108, 21). Preferably, for that purpose, the two auxiliary covering members (10, 10') should be made of such elastic material of self-recovery property as vinyl chloride. Consequently, the inclined cut edges (10a-1)(10a'-1) serve to avoid the exposure of the holes (108, 21) which imparis the appearance of tht area, and the present third embodiment therefore improves the appearance of the seat aesthetically.

Figure 9:
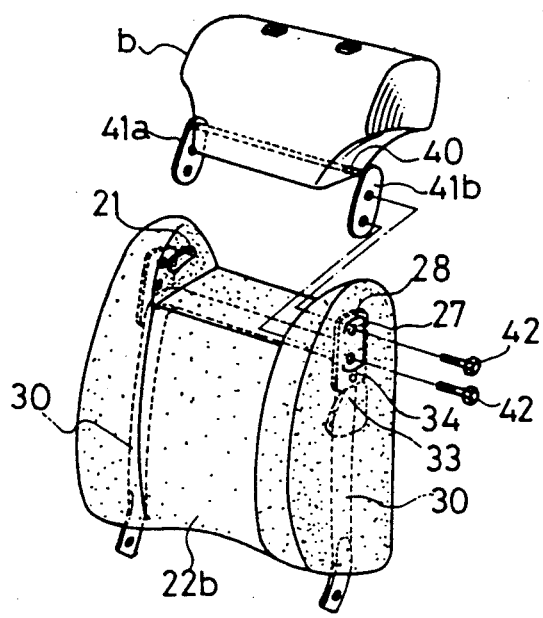
FIG. 9 is an exploded perspective view of a seat back in the fourth embodiment.
Figure 10:
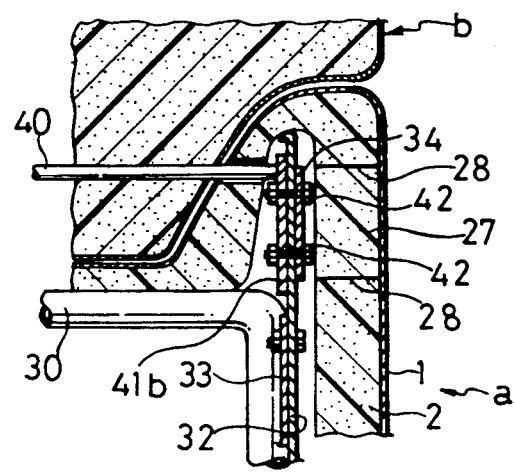
FIG. 10 is a sectional view showing a principal part of the fourth embodiment.
Figure 11:
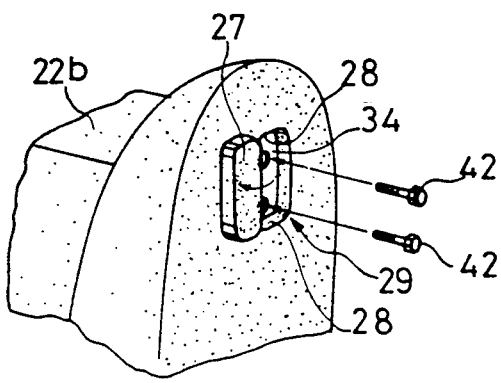
FIG. 11 is a partial perspective view showing the principal part of the fourth embodiment.

FIGS. 9 through 11 show a fourth embodiment of the present invention. In that embodiment, is employed a lower seat-back section (a') slightly different from the above-described ones, excepting the upper seat-back section (b) which is identical in structure to those in the above-stated first, second and third embodiments. Referring to FIG. 9 and 10, the lower seat-back section (a') comprises a inverted U-shaped frame (30), a pair of movable brackets (34) which are respectively rotatably provided at both upper lateal back sections of the frame (30), an adjusting device (34) for adjusting the fore-and-aft inclination of the upper seat-back section (b) which is the same with the ones that have been described in the preceding three embodiments and disposed at one side of the frame (30), an integral mass of padding (22b) which is attached over thus-formed framework, and a coevering member (1) affixed to the surfaces of the padding (22b) along the outer contour of the latter.

As shown, the connecting links (41a) (41b) of the upper seat-back section (b) are fixedly connected to the two movable brackets (34) by means of the bolts (42) (42). Therefore, in the past, as is the case with the foregoing third embodiment, only a hole (i.e. at (26) in that third embodiment, for example) is formed at the upper lateral side of the padding (22b) where inside the same the movable bracket (34) is present, so that the bolts (42) (42) are made accessible through the hole to the movable bracket (34) for connecting the connecting links (41b) to the movable bracket (34). However, it has been found defective that the portion of a covering member (i.e. at (1) in FIG. 10) which overlies such hole is loosen into a slack, wrinkle or recessed portion, resulting in the impairment of the outer aesthetic appearance of the lower seat-back section (a).

In order to solve this problem, according to the present fourth embodiment, as best seen from FIG. 11 in conjunction with FIG. 9, a lid (27) and rectangular hole (34) are formed at the upper lateral surface of the padding (22b). Although not clearly shown, those lid and hole are formed at the other upper lateral surface of the padding (22b) for the same purpose, and only with regard to the one upper lateral surface of the padding (22b) (namely, the left-side upper lateral surface of the padding (22b) as viewed from FIG. 9), a specific description will be made hereinafter.

As best seen from FIG. 11 in conjunction with FIG. 9, a lid (27) and rectangular hole (29) are formed at the upper lateral surface of the padding (22b). It should be noted that the lid and hole (27) (34) are also formed at the other upper lateral surface of the padding (22b), although not shown. Those lid (27) and hole (29) are formed by cutting the corresponding part in that upper lateal surface of the padding (22b) in a manner giving a generally "C"-shaped incision (28), using a jigsaw, and then a cut mass (i.e. the lid (27)) is forcibly taken out from and along such "C" shaped incision (28), and turned at 180 degrees about the non-incised area in the arrow direction as shown in FIG. 11, whereupon there appears the hole (29), rendering accessible the bolts (42) (42) through the hole (29) into the movable brackets (34).

For the sake of this effect, the padding (22b) should be made of a foam material such as urethane foam having a soft, elastic property, so as to permit the cut mass (i.e. at (27)) to be easily picked up and turned from the hole (29).

Thus, after having secured the bolts (42) (42) to the movable bracket (34) to connect the link (41b) of the upper seat-back section (b) thereto, the lid (27) is turned back into the hole (29), whereby with the aid of the elasticity of the padding (22b) per se, the lid (27) is bodily inserted in the hole (29) with its upper surface being in registry with the surrounding surface.

Accordingly, as the hole (29) is closed by the lid (27) which is integrally formed therewith at the the non-incised area, the outer surface of the lid (27) lies flush with the surrounding surface of the upper lateral side of the padding (22b), and there is no slack, wrinkle or recessed portion as is found in the prior art.

While having the present invention as above, it should be understood that the invention is not strictly limited to the illustrated embodiments, but any other modification, replacement and addition may be possible insofar as they are not departed from the scope and spirit of the appended claims for the invention.

What is claimed is:

1. A seat back of an automotive seat having no slack or gap on an outer surface covering member between an upper seat-back section and a lower seat-back section, comprising:

an upper seat-back section having formed at its lower lateral parts, a pair of arcuate cut-away portions;

a lower seat-back section having formed at its upper part, a pair of spaced-apart projected portions formed in a shape generally conforming to said pair of arcuate cut-away portions, wherein there is formed an elongated hole in inward surfaces of said pair of projected portions to establish a close contact between said cut-away portions of said upper seat-back section and said projected portions of said lower seat-back section;

a shaft disposed within the upper seat-back section such that end parts of the shaft extend from said pair of arcuate cut-away portions;

a pair of connecting means on said end parts of said shaft;

inclination adjustment means disposed within said lower seat-back section for adjusting an inclination angle of said upper seat-back section relative to said lower seat-back section; and wherein, within said projected portions, lower end parts of said connecting means are coupled with said inclination adjustment means, and said shaft is movably disposed within said elongated holes for forward and backward movement when said upper seat-back section is adjusted in its inclination angle by operating said inclination adjustment means, to incline said upper seat-back section forwardly and backwardly upon said lower seat-back section, without forming slack or a gap between said upper seat-back and said lower seat back.

2. The seat back according to claim 1, wherein said pair of projected portions comprises a padding and a covering member to cover an upper extension of a seat frame, and wherein at both lateral surfaces of said projected portions, an openable lid means is disposed for making an accessible connecting point between said shaft and inclination adjusting means.

3. The seat back according to claim 1, wherein said connection portion includes a shaft which is extended through said upper seat-back section so that both ends of said shaft is projected from the respective said pair of arcuate cut-away portions of said upper seat-back section, wherein said both ends of said shaft are each fixedly provided with a connecting link, and wherein said connecting links are rotatably connected to said frame in said lower seat-back section.

4. The seat back according to claim 1 wherein said pair of sub padding are formed by being foamed in a mold into a shape sufficient to cover said two side brackets.

5. The seat back according to claim 1, wherein said pair of sub padding are each formed in a cap-like shape so as to cover the respective said two upwardly extending upper ends of said two side brackets only, and wherein said main padding is so formed as to cover both said frame and two side brackets, excepting said two upwardly extending upper ends of said two side brackets.

6. The seat back according to claim 1, wherein it further comprises a covering member that covers upper surfaces of said main and sub paddings, and wherein said covering member is bonded to said main padding, excepting said pair of sub paddings.

7. The seat back according to claim 3, wherein there is formed an elongated hole at an inner surface of each of said two sub paddings, wherein said both ends of said shaft passes through said elongated holes respectively of said sub paddings, wherein further said seat back comprises a covering member which covers whole bodies of said main and sub paddings, said covering member being formed with a pair of elongated holes at a point corresponding to said elongated holes of said paddings, such that said shaft of said upper seat-back section is slidingly movable along said elongated holes of said sub paddings and coveing member, and wherein a covering means is provided at said elongated holes, said covering means being so arranged as to cover a part of said elongated holes in an elastical manner, to thereby avoid an external view of said elongated holes and their insides when said upper seat-back section is inclined upon said lower seat-back section.

8. The seat back according to claim 7, wherein said covering means comprises an auxiliary covering member sewn partially to reverse side of said covering member and wherein said auxiliary covering member is formed in a cap-like shape such as to cover an upper end part of each of said two sub paddings.

9. The seat back according to claim 8, wherein said auxiliary covering member is so formed as to cover at least half of said elongated holes of said sub padding and covering member in a longitudinal direction of said elongated holes and wherein a portion of said auxiliary covering member which covers said half of said elongated holes is elastically movable in said longitudinal direction.

10. The seat back according to claim 9, wherein said auxiliary covering member has, formed at its one side, an inclined cut edge which extends from base lower edge thereof up to upper end part thereof, thereby defining a inclined covering area followed by said inclined cut edge, and wherein said covering area covers said half of said elongated holes.

11. The seat back according to claim 10, wherein at a connecting point in said main padding or sub padding where said upper seat-back section is connected to said seat-back section, is formed a generally "C"-shaped incision which allows opening of that particular incision to make accessible a connecting means into said connected point, for connecting together said upper and lower seat-back sections by means of said connecting means, and wherein said incision includes a lid and hole, said lid being integral with said hole at a non-incised area in said incision, such that said lid may be taken out and turned from said hole, to thereby open said hole and may be inserted back into said hole, to thereby close the hole.

12. The seat back according to claim 10, wherein said main and sub paddings are formed integrally with each other by being foamed in a mold into one integral padding.

13. The seat back according to claim 1, having a main foam padding attached over said frame; and a pair of sub-paddings formed independently of a main padding, said pair of sub-paddings being adapted for attachment over at least said two upwardly extending upper ends of said pair of side brackets.

* * * * *